United States Patent [19]
Kniff

[11] 3,885,815
[45] May 27, 1975

[54] TOWING DEVICE

[76] Inventor: August A. Kniff, 137 S. Eucla, San Dimas, Calif. 91773

[22] Filed: Jan. 9, 1974

[21] Appl. No.: 432,067

[52] U.S. Cl. ............................. 280/402; 214/86 A
[51] Int. Cl. ............................................. B60p 3/06
[58] Field of Search ........ 280/402, 491 R; 214/86 A

[56] References Cited
UNITED STATES PATENTS

| | | | |
|---|---|---|---|
| 1,690,372 | 11/1928 | Livesay | 214/86 A |
| 1,860,518 | 5/1932 | Wells | 280/402 |
| 1,864,781 | 6/1932 | Wells | 280/402 |
| 2,726,777 | 12/1955 | Wiley | 214/86 A |
| 3,501,169 | 3/1970 | Nutt | 280/491 R |

*Primary Examiner*—Leo Friaglia
*Assistant Examiner*—Randall A. Schrecengost
*Attorney, Agent, or Firm*—Donald D. Mon

[57] ABSTRACT

An attachment member having a cross bar and a pair of legs is attached to the under side of a vehicle to be towed in such a manner that it is attached to the rear of the rear wheel axle and also in front of the rear wheel axle with the legs extending beneath the axle so as to be clear of the axle when the vehicle is resting on all four wheels. When it is desired to tow the vehicle a tow bar is fitted to the attachment means at two positions with the rear end of the tow bar protruding to the rear of the towed vehicle. The legs of the attachment member are provided with sliders which can be moved to positions beneath the axle so that when the rear end of the tow bar is raised, the sliders engage the under side of the rear wheel axle and the vehicle is lifted.

9 Claims, 4 Drawing Figures

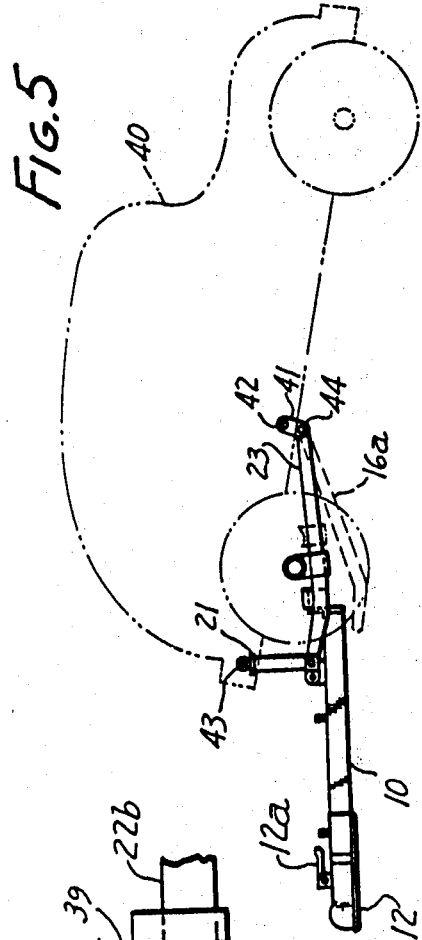
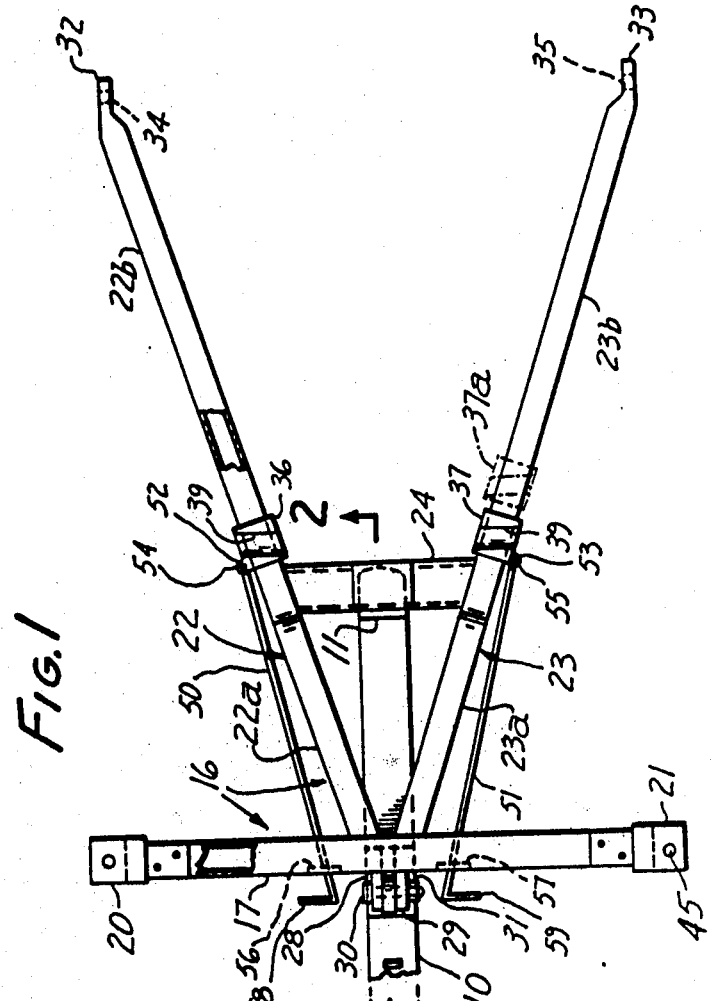
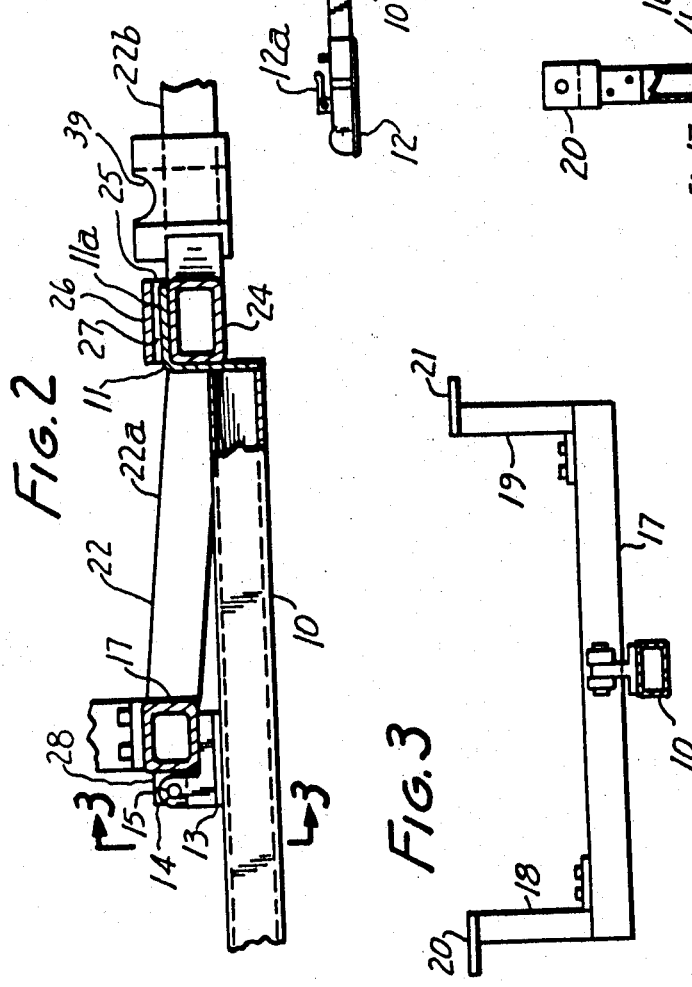
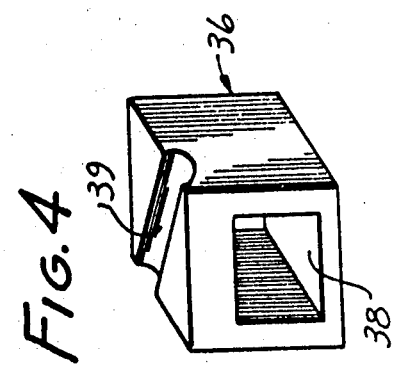

TOWING DEVICE

This invention relates to towing devices for towing four-wheel vehicles.

In my application Ser. No. 264,766 filed June 21, 1972 and now U.S. Pat. No. 3,758,135 there are disclosed and claimed towing devices provided with a cross bar at the location of the front end torsion bar and axle assembly so that the tow bar can protrude beneath the front end and engage a clip or yoke attached to the vehicle frame. The torsion bar assembly can be retained within channels attached to the cross bar so that when the forward end of the tow bar is lifted it lifts the front end of the vehicle and can be attached to the towing vehicle. While the towing device of that application is applicable to the towing of some models of vehicles there are other models to which it is not applicable, particularly those having plural torsion bars which are not always at the same height or distance apart in different vehicles.

In my co-pending application Ser. No. 314,740 filed Dec. 13, 1972 there is disclosed and claimed a towing device which can tow vehicle models having structural and dimensional variations one from another, and which can be fitted to vehicles having plural torsion bars.

The towing arrangements of my prior applications Ser. Nos. 264,766 and 314,740, now U.S. Pat. No. 3,831,980 are particularly adpated to towing vehicles by attachment at their front ends.

An object of the present invention is to provide a towing device which is simple in construction and simple to fit to a vehicle.

Another object is to provide such a device which can tow a four-wheel vehicle from its rear end.

The invention is carried out by provision of an attachment member to be secured to the underside of the chassis of the four-wheeled vehicle to be towed. The attachment member is provided with a cross bar having a coupling means and an upstanding means adapted to engage an under part of the rear end of the chassis, and having leg means extending from the cross bar forwardly beneath the rear axle of the towed vehicle to a forward position in front of the axle. The leg means is provided with a tongue receiving means and is pivoted to the chassis at said forward position. Slider means is provided on the leg means adapted to be slid back and forth between a location beneath the axle and a location away from the axle.

For towing the vehicle there is provided a tow bar having a tongue at its forward end for engagement with the tongue receiving means, and an attaching means at an intermediate position of the tow bar for attaching to the said coupling means of the attachment member. The rear end of the tow bar extends rearwardly from the said attaching means so that lifting the rear end of the tow bar to hook it to a towing vehicle will raise the rear end of the towed vehicle.

The foregoing and other features of the invention will be better understood from the following detailed description and the accompanying drawings, of which:

FIG. 1 is a plan view of a towing device according to this invention;

FIG. 2 is a view partially in cross-section taken at line 2—2 of FIG. 1 showing a portion of the device;

FIG. 3 is a view taken at line 3—3 of FIG. 2;

FIG. 4 is an isometric view of a slider used in the device of FIGS. 1 to 3; and

FIG. 5 illustrates the attachment of the towing device to a vehicle:

The towing device shown in the drawing comprises a straight tow bar 10 having a tongue in the form of an angle member 11 fixed to the rear end of it and a locking attachment 12 fixed to the forward end for attachment to a towing vehicle. At an intermediate position between the tongue and the locking attachment there is fixed to the upper surface of the tow bar an upstanding lug 13 whose upper end is in the form of an upstanding lip 14 having a hole 15 through it. The bar is preferably in the form of a hollow beam having a square or rectangular cross-section as best seen in FIG. 3.

The tow bar is adapted to be fitted to an attachment member adapted to be fastened to the under part of the vehicle to be towed. Attachment member 16 comprises a cross bar 17 the outer ends of which are provided with upstanding members 18 and 19 respectively, bolted or otherwise fastened to cross bar 17.

The upper end of upstanding member 18 has fastened to it, as by welding, a plate 20, and upstanding member 19 is similarly provided with a similar plate 21. The cross bar 17 is preferably in the form of a hollow beam with square or rectangular cross-section as best seen in FIG. 2, and the upstanding members 18 and 19 are also preferably of hollow beam construction.

A pair of legs 22 and 23 of equal length are rigidly fastened to the cross bar 17 at a position midway between the ends of the cross bar, and from this position of fastening the two legs diverge from each other rearwardly with reference to the tow bar 10, and are rigidly held in this divergent position by a cross member 24. The manner of fastening legs 22 and 23 to cross bar 17 and of fastening the cross member 24 to the legs is preferably by welding. The legs 22 and 23 and cross bar 24 are preferably of hollow beam construction having square or rectangular cross-section as best seen in FIGS. 1 and 2.

A strip 25 upstanding from the central part of cross member 24 supports a flat horizontal strip 26 fixed to strip 25 and separated from the top of member 24 to provide a space 27 into which the horizontal portion 11a of tongue 11 can be inserted, as best seen in FIG. 2.

The forward part of cross bar 17 is provided at its central position with a pair of forwardly extending lugs 28 and 29 spaced apart from each other by a sufficient distance to permit the entry of lip 14 between them. The lugs each are provided with a hole aligned with hole 15 of lip 14 to permit the passage of a bolt 30 through all three of these holes, the bolt being fastened by a nut 31.

The forward ends of legs 22 and 23 are formed into respective flat portions 32 and 33 through which there are formed horizontally extending holes 34 and 35.

Each leg 22 and 23 is provided with a respective slider 36 and 37 at positions forward of the cross member 24. One of these sliders is shown in FIG. 4. It has the form of a short section of a hollow beam of square or rectangular cross-section. The opening of its internal passageway 38 is a square or rectangle large enough to slidably fit over the leg 22 or 23 and the thickness of its wall is sufficient to accommodate an exterior groove 39 at its upper surface, having the shape of a portion of a cylinder, the axis of which is oblique to the central axis of the internal passageway 38 such that the grooves 39 of the two sliders 36 and 37 can align with each other along an axis parallel to the length of cross bar 17 as shown in FIG. 1. Thus the sliders 36 and 37 can be slid along the respective legs 22 and 23 to desired positions in front of cross member 24.

For the purpose of facilitating the sliding of these sliders, rods 50 and 51 are attached to respective sliders 36 and 37 by means of respective pins 52 and 53 attached to the respective rods and passing through holes through respective lugs 54 and 55 attached to the respective sliders. The rods 50 and 51 extend forwardly from the sliders and pass through holes through guides 56 and 57, respectively, to the rear of which the rods are bent to form respective handles 58 and 59. Thus, by grasping the handles 58 and 59 the sliders may be moved backward and forward for some distance along their respective legs 22 and 23.

The legs 22 and 23 are each provided with a bend at a position just behind cross bar 24 so that their sections 22a and 23a are on an upward tilt from sections 22b and 23b respectively. The purpose of this bend of the legs is explained below with reference to FIG. 5 which illustrates the attachment of the device to a four-wheel automobile in a manner to lift the rear wheels off the ground and pull the vehicle 40 rearwardly with its front wheels rolling on the ground.

As explained above, attachment member 16 is an item separate from tow bar 10, and is intended to be fastened permanently beneath the vehicle to be towed. The vehicle 40 is assumed to be of the type whose rear suspension comprises a pair of springs extending in the fore and aft direction, there being such a spring below the chassis just inside of each of the rear wheels, and the two ends of each spring being attached to a shackle supported by the chassis so that there is a forward shackle in front of each rear wheel and a rear shackle behind each rear wheel.

On vehicles having a suspension other than springs as described above, the forward ends of members 22 and 23 may be attached by brackets or other means to the chassis or chassis frame, or both. The uprights 18 and 19 may then be attached to a rear part of the chassis or chassis frame, or both, by the use of brackets or other means.

FIG. 5 shows the said forward shackle 41 for one of the springs pivotable on its support 42 attached to the chassis of the vehicle and also shows the rear shackle support 43 for the same spring. FIG. 5 further shows the forward end of leg 23 pinned to the shackle pin 44 which holds the front end of the spring, on the same side of the vehicle, and it shows the plate 21 of upright 19 beneath the rear shackle support 43 of the same spring such that plate 21 is fastened to the shackle support on the chassis by a suitable bolt passed through a hole 45 into the shackle support or chassis member.

The dimensions of the members of attachment 16 are such that when all four wheels of the vehicle are on the ground the weight of the vehicle bends the rear suspension springs sufficiently so that no part of the attachment member 16 is in contact with the rear wheel axle above it. Instead, the member 16 and the sliders 36 and 37 are at some distance beneath the axle as indicated by dotted lines 16a. When however, it is desired to tow the vehicle the tow bar 10 is fitted to the attachment member 16 by inserting the tongue member 11a into space 27 and passing and fastening bolt 30 through the holes of lugs 28 and 29 and hole 15 of upstanding lip 14 so that the tow bar is now secured to the attachment member 16.

The rear end of the tow bar is then lifted, which may be done manually where the towed vehicle is not large and the protruding rear end of the tow bar is of substantial length, and the locking attachment 12 is placed over the towing ball of the towing vehicle in a well-known manner after which it can be latched in a well-known manner by a latching device 12a. This lifting of the tow bar pivots the combined tow bar 10 and attachment member 16 around pivot pins 44 at the two sides of the towed vehicle, so that the upstanding members 18 and 19 lift the rear end of the vehicle. With the weight of the vehicle thus removed from its rear suspension springs, the rear part of the body moves upward relative to the rear axle so that the legs 22 and 23 come up under the rear axle. Before causing the legs to meet the axle in this manner the slider members 36 and 37 are moved from a forward position on the legs as represented by dotted lines 37a to a position just beneath the axle so that the aligned grooves 39 of the sliders come up and support the axle while the upstanding members 18 and 19 are supporting the rear end of the chassis. The diameter of the partial cylinders 39 of the slider are made to conform with the diameter of the axle.

This towing arrangement is especially applicable to the towing of small vehicles by a larger vehicle such as a camper. It will be required of course to secure the front wheels against turning during any towing or backing up operation.

The towing arrangement of this invention provides an advantage of great lifting leverage due to its double fulcrum structure, one being at forward ends 32, 33 and the other at tongue 11a. Thus the force required to lift the end of the bar at latch 12 is only a minor fraction of the weight of the part of the vehicle being lifted.

It will be understood that the embodiments of the invention illustrated and described herein are given by way of illustration and not of limitation, and that modifications or equivalents or alternatives within the scope of the invention may suggest themselves to those skilled in the art.

I claim:
1. Towing means for towing a four-wheeled vehicle having a chassis from which its rear wheels mounted on an axle are suspended, comprising:
   an attachment member having a cross bar provided with a coupling means and an upstanding means adapted to fasten to an under part of the rear end of the chassis of the towed vehicle, and having leg means extending from the cross bar forwardly beneath the rear axle to a forward position in front of the axle, said leg means having a tongue receiving means;
   means at said forward position pivoting the leg means to the chassis;
   slider means on the leg means adapted to be slid back and forth between a location beneath the axle and a location away from the axle;
   a tow bar having a tongue at its forward end and an attaching means at an intermediate position of the tow bar for attaching to said coupling means;
   said tow bar having a rear end extending rearwardly from said attaching means;

whereby when the tongue is attached to the tongue receiving means and the attaching means is fastened to the coupling means the rear end of the vehicle can be lifted by lifting the rear end of the tow bar.

2. Towing means according to claim 1 in which the upstanding means comprises two uprights at opposite ends of the cross bar, equidistant from the coupling means.

3. Towing means according to claim 1 in which the leg means comprises two legs diverging from each other from the cross bar for attachment to opposite sides of the chassis.

4. Towing means according to claim 3 in which the tongue receiving means is on a cross member spanning the diverging legs to the rear of the cross bar.

5. Towing means according to claim 3 in which the slider means comprises a slider on each leg.

6. Towing means according to claim 3 in which the legs each have a bend at the cross member so that the rear part of each leg extends obliquely upwardly from the forward part.

7. Towing means according to claim 1 in which a tow hitch is located at the front end of the tow bar.

8. Towing means according to claim 1 in which the tongue receiving means is rearward of the means of pivoting the leg means to the chassis, whereby great lifting leverage is provided.

9. Towing means according to claim 8 in which the coupling means is rearward of the tongue receiving means.

* * * * *